US008857834B2

(12) United States Patent
Van der Knaap et al.

(10) Patent No.: US 8,857,834 B2
(45) Date of Patent: Oct. 14, 2014

(54) ACTIVE ROLL STABILIZATION ASSEMBLY AND VEHICLE SUSPENSION PROVIDED THEREWITH

(75) Inventors: Albertus Clemens Maria Van der Knaap, Helmond (NL); Robert Marijn Anthony Frank Verschuren, Eindhoven (NL); Raymond Bernardus Gerhardus Tinsel, Eindhoven (NL); Ronny Maria Theophilus Wouters, Ubachsberg (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 360 days.

(21) Appl. No.: 12/745,179

(22) PCT Filed: Nov. 26, 2008

(86) PCT No.: PCT/NL2008/050749
§ 371 (c)(1),
(2), (4) Date: Nov. 19, 2010

(87) PCT Pub. No.: WO2009/070017
PCT Pub. Date: Jun. 4, 2009

(65) Prior Publication Data
US 2011/0049818 A1 Mar. 3, 2011

(30) Foreign Application Priority Data
Nov. 27, 2007 (EP) ..................... 07121694

(51) Int. Cl.
*B60G 21/055* (2006.01)
*B62D 33/067* (2006.01)
*B60G 99/00* (2010.01)
*B62D 33/06* (2006.01)
*B60G 21/05* (2006.01)

(52) U.S. Cl.
CPC ........ *B60G 21/0555* (2013.01); *B60G 2300/02* (2013.01); *B60G 2202/1362* (2013.01); *B62D 33/067* (2013.01); *B60G 99/002* (2013.01); *B62D 33/0604* (2013.01); *B60G 2202/1351* (2013.01); *B60G 2202/442* (2013.01); *B60G 21/051* (2013.01)
USPC ....... 280/124.106; 280/124.103; 280/124.152

(58) Field of Classification Search
CPC ...................................... B60G 21/055
USPC ............ 280/5.508, 5.507, 124.103, 124.106, 280/124.149, 124.152, 124.137, 124.13, 280/679; 180/89.14
See application file for complete search history.

(56) References Cited
U.S. PATENT DOCUMENTS 3,002,765 A * 10/1961 MacDuff ................... 280/5.503
3,039,557 A 6/1962 Boyce et al.
(Continued)

FOREIGN PATENT DOCUMENTS

EP 1175307 1/2002
WO WO 97/46439 12/1997

*Primary Examiner* — Karen Beck
(74) *Attorney, Agent, or Firm* — Jennifer E. Lacroix; DLA Piper LLP (US)

(57) ABSTRACT

The invention relates to an ARS (active roll stabilization) assembly (1) for vehicles, as well as to a suspension system equipped with such ARS assembly. The assembly comprises a torsion bar (3) and an actuator (10) for adjusting a torsion angle of said torsion bar. The ARS assembly furthermore comprises an additional torsion bar (5). This additional torsion bar is arranged such that its torsion axis extends substantially parallel to the torsion axis of the first, adjustable torsion bar, or coincides therewith.

12 Claims, 5 Drawing Sheets

(56) References Cited

U.S. PATENT DOCUMENTS

| | | | |
|---|---|---|---|
| 3,298,709 A * | 1/1967 | Mercier | 280/104 |
| 3,312,303 A | 4/1967 | Milloy | |
| 5,826,687 A * | 10/1998 | Bungeler et al. | 188/296 |
| 6,073,714 A * | 6/2000 | McHorse et al. | 180/89.14 |
| 6,206,121 B1 * | 3/2001 | Michel | 180/89.13 |
| 6,439,583 B1 * | 8/2002 | Markowetz | 280/5.511 |
| 6,752,401 B2 * | 6/2004 | Burdock | 280/5.508 |
| 7,232,180 B2 * | 6/2007 | Biasiotto et al. | 296/190.07 |
| 7,566,063 B2 * | 7/2009 | Oki et al. | 280/124.106 |
| 7,798,508 B2 * | 9/2010 | Wettlaufer, Jr. | 280/124.152 |
| 8,170,749 B2 * | 5/2012 | Mizuta | 701/38 |
| 8,371,562 B2 * | 2/2013 | Knevels | 267/64.27 |
| 2003/0075882 A1 * | 4/2003 | Delorenzis et al. | 280/5.508 |
| 2003/0080526 A1 * | 5/2003 | Conover | 280/124.106 |
| 2004/0245732 A1 * | 12/2004 | Kotulla et al. | 280/5.502 |
| 2006/0049601 A1 * | 3/2006 | Matsumoto | 280/124.106 |
| 2006/0116802 A1 * | 6/2006 | Yamada et al. | 701/37 |
| 2007/0080011 A1 * | 4/2007 | Kang | 180/89.14 |
| 2008/0111326 A1 * | 5/2008 | Taneda et al. | 280/5.511 |
| 2009/0091094 A1 * | 4/2009 | Sano | 280/5.511 |
| 2010/0102521 A1 * | 4/2010 | Hidaka et al. | 280/5.508 |
| 2011/0049818 A1 * | 3/2011 | Van der Knaap et al. | 280/5.508 |
| 2011/0089658 A1 * | 4/2011 | Buhl et al. | 280/124.106 |
| 2012/0049480 A1 * | 3/2012 | Lee et al. | 280/124.106 |
| 2012/0061934 A1 * | 3/2012 | Scaduto | 280/124.106 |

* cited by examiner

ACTIVE ROLL STABILIZATION ASSEMBLY AND VEHICLE SUSPENSION PROVIDED THEREWITH

The invention relates to an ARS (active roll stabilization) assembly.

Such an ARS assembly is known, for instance from EP 1 175 307. These assemblies are applied in vehicle suspensions to reduce roll motions, i.e. rotations of the sprung vehicle mass around its longitudinal axis. Such roll motions may for instance arise during sharp turns. The known ARS assemblies generally comprise a torsion bar that interconnects a left side of the suspension system with a right side. The torsion bar is divided into two bar segments, which are rotatably connected to each other, around a torsion axis, by means of a hydraulic rotation actuator. The actuator is linked to a hydraulic circuit, comprising a reservoir, supply and return lines, pumping means and one or more control valves, for controlling a flow to and/or pressure in the actuator. This pressure is converted into a desired anti-roll moment, capable of counteracting any external roll moment acting on the sprung vehicle mass.

A problem of this known ARS assembly is its dynamic behaviour in failure mode, i.e. upon any interruption in the hydraulic fluid supply. Such interruption may for instance occur due to power failure, failure in the control circuitry or due to stand still of the vehicle (as the pumping means are generally driven by the vehicle's combustion motor). To solve this problem, known ARS assemblies are equipped with a fail-safe valve, arranged to block a return line of the actuator so as to lock the actuator in position, in case of failure. Unfortunately, such fail-safe valve cannot prevent fluid from leaking away from the actuator, causing the roll moment of the ARS assembly to decrease gradually. This is especially troublesome when the suspension system has a relatively low stiffness and/or the centre of gravity of the sprung vehicle mass is located relatively high. In these instances, the reduced roll moment and/or the absence of active roll control options may result in large roll angles, which may result in the vehicle becoming too instable to be driven safely.

It is an object of the invention to overcome the abovementioned problem. To that end an ARS assembly according to the invention is characterized in that an additional torsion bar is provided, having a torsion axis extending substantially parallel to a torsion axis of the first, adjustable torsion bar.

The additional torsion bar provides the ARS assembly with a residual roll stiffness, which is sufficiently high to maintain roll motions of the sprung mass within stable margins, so as to allow safe continuation of the vehicle ride, in failure mode. The first adjustable torsion bar may for instance be a torsion bar with an incorporated hydraulic rotation actuator.

According to an advantageous aspect of the invention, the additional torsion bar features an open cross section, for instance a C-shape. Thanks to such open cross section this additional torsion bar can feature a relatively low torsion stiffness, but a relatively high bending stiffness. Consequently, it can contribute to the overall torsion stiffness of the ARS assembly so as to provide optimal residual roll stiffness, low enough for acceptable ride comfort, without however, becoming too flexible for contributing to a second function of the assembly, i.e. that of stabilising the sprung mass. This latter feature is especially relevant when the stabilising functionality is utilized for vertical guidance of the sprung mass, e.g. in case where the assembly is used as truck cabin suspension. Furthermore, corresponding increases in torsion couples and accompanying energy consumption for eventual rotation of the residual stiffness can be minimal, while at the same time safe roll behaviour can be guaranteed in failure mode, i.e. with the hydraulic supply to the actuator being interrupted.

According to a further advantageous aspect of the invention, the additional torsion bar can be arranged to absorb most of the external bending loads, so as to provide the ARS assembly with a stable and robust geometry, wherein the adjustable torsion bar is safeguarded from being exposed to bending loads and/or bending deformations. Consequently, the adjustable torsion bar may be designed with reduced torsion stiffness. This may benefit the high frequent ride comfort, which is not actively controlled by the ARS assembly but mainly depends on said torsion stiffness.

Also, in the absence of bending loads and accompanying bending deformations in the adjustable torsion bar, the rotation actuator can be located more freely, for instance there where bending deformations and stresses would otherwise be too high for the actuator. Further, the actuator may be fixated directly to the bar segments, i.e. without intermediate bearings or the like provisions for absorbing bending loads and/or axial loads. This may reduce the complexity, production and maintenance costs of the assembly and increase its robustness and lifetime.

According to yet another advantageous aspect of the invention, the additional bar with open cross section can extend around the adjustable torsion bar, at least partially. Thus the overall dimensions of the assembly can be reduced, allowing its application in narrow spaces. Moreover, such arrangement prevents the assembly from being subjected to additional axial stresses. Such additional axial stresses can occur in both said adjustable torsion bar and said additional bar when the axes of said bars do not coincide with the torsion rotation axis of the assembly.

The invention furthermore relates to a vehicle suspension provided with an ARS assembly according to the invention. The suspension may be a primary suspension, for suspending the vehicle wheels to the chassis, or a secondary suspension, for suspending some other vehicle mass to the chassis, like a truck cabin. In the latter case, an ARS assembly according to the invention offers several additional advantages over the ones already mentioned. For instance, the additional torsion bar can help to guide vertical cabin movement, as mentioned above. Furthermore, the assembly may facilitate tilting of the cabin, which may be needed to provide access to the vehicle motor. Also, levelling of the suspension members may be accomplished with conventional, simple levelling means, thanks to the aforementioned residual stiffness which provides for sufficient roll stability in non-controlled mode.

Further advantageous embodiments of an ARS assembly according to the invention and a vehicle suspension provided therewith are set forth in the dependent claims.

To explain the invention, exemplary embodiments thereof will hereinafter be described with reference to the accompanying drawings, wherein:

FIG. 1 schematically shows an ARS assembly according to the invention, in top view;

Figure 1:
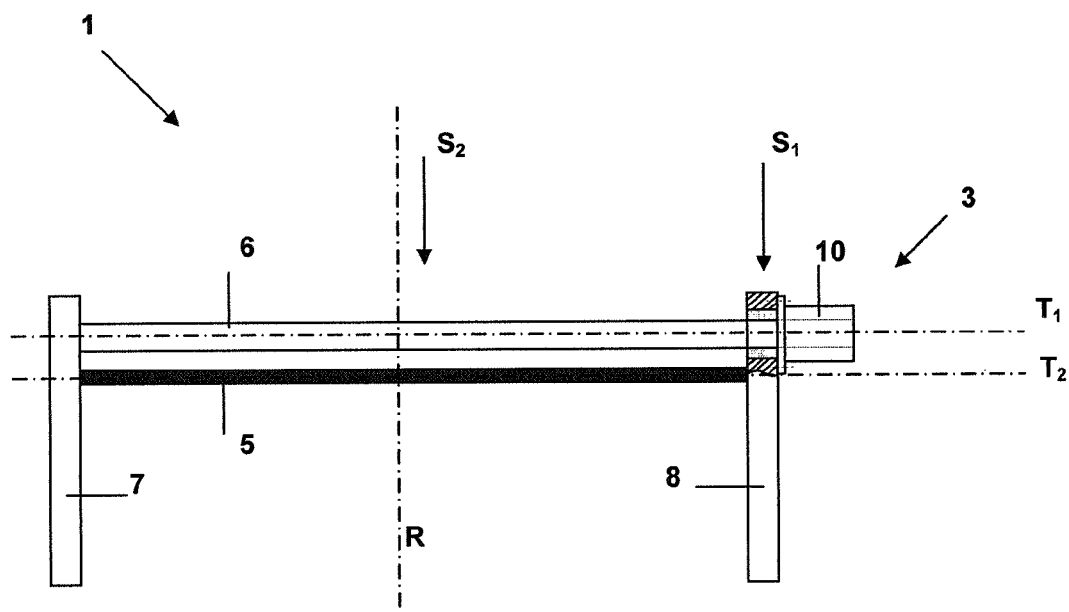

FIG. 1 schematically shows a first embodiment of an ARS assembly 1 according to the invention. The assembly comprises an adjustable torsion bar 3 and an additional torsion bar 5.

The adjustable torsion bar 3 comprises a substantially rod or tubular shaped centre part 6 and two arms 7, 8 which in use are pivotally connected to a left and right side of a vehicle suspension system. This may be a primary suspension A for suspending wheels of a vehicle, or a secondary suspension B for suspending some other vehicle mass, e.g. a cabin 20 of a truck, as for instance shown in FIG. 7. The torsion bar may be coupled to the vehicle mass, for instance the cabin 20, by means of ball joints (not shown). Such ball joints can adapt their orientation to misalignments and/or deformations of the torsion bar, thereby allowing the torsion bar to pivot smoothly during use, without excessive frictional forces and/or excessive deformation stresses in the respective components.

In another embodiment of the invention (not shown), the adjustable torsion bar 3 may also be connected via drop links to said vehicle mass, such as the cabin 20 of a truck. Drop links may at one end preferably via a ball joint be connected to the bar 3 and at the other end preferably via a ball joint be connected to the cabin 20. Drop links may be provided in case that no specific location for direct connection of the torsion bar to the vehicle mass, such as the cabin 20, is available on said vehicle mass. Furthermore, drop links can be used in case that the connection of the torsion bar of the vehicle mass is subjected to different movement directions next to a vertical movement; for instance, at a connection of the torsion bar with the front wheels of a car.

The adjustable torsion bar 3 furthermore comprises a rotation actuator 10, which divides the torsion bar 3 in two segments $S_1$, $S_2$ which are rotatable relative to each other around a torsion axis $T_1$. In the illustrated embodiment the rotation actuator 10 is located at the intersection of the centre part 6 and one of the arms, here the right arm 8. The connection of the actuator 10 to these components is shown in further detail in FIG. 6, and will be discussed hereinafter. Depending on the available space, the division of the torsion bar 3 in segments $S_1$, $S_2$ can be realized at a different location, i.e. somewhere halfway the centre part 6, in which case the rotation actuator 10 will be relocated accordingly.

The rotation actuator is fed by a hydraulic circuit (not shown), which may comprise a hydraulic reservoir, a supply line and a return line for connecting this reservoir to the actuator, pumping means for circulating hydraulic fluid between the reservoir and the actuator, one or more valves and control logic for controlling a flow to and/or a pressure in the actuator according to some control strategy.

The additional torsion bar 5 in the illustrated embodiment comprises a rod shaped or tubular member that is mounted between the arms 7, 8 of the adjustable torsion bar 3, such that its torsion axis $T_2$ extends substantially parallel to that $T_1$ of the adjustable torsion bar 3.

The ARS assembly 1 functions as follows. During use, the vehicle may be subjected to external roll moments (around axis R in FIG. 1) for instance when making a turn. Depending on the rotation direction of this roll moment, the left or right suspension side will experience an increased load while the other side will experience a decrease in load. This external roll moment can be measured, for instance by measuring the lateral motion (displacement, velocity or acceleration) of the suspended vehicle mass. The rotation actuator 10 can thereupon be controlled to rotate the segments $S_1$, $S_2$ over a distinct rotation angle around torsion axis $T_1$, which will cause the adjustable torsion bar 5 to exert a counter moment on the vehicle suspension (around axis R, in opposite direction as the external roll moment). Depending on the control strategy this counter moment may for instance be controlled to have a magnitude that substantially matches that of the external roll moment, so as to keep the suspended vehicle mass substantially horizontal, i.e. parallel to the road surface. Alternatively, the counter moment may be controlled to keep the suspended vehicle mass parallel to a chassis of the vehicle. Still other control strategies are possible, depending on for instance the needs of a driver of the vehicle.

In case of a failure in the hydraulic circuit that feeds the actuator, the supply to and from the actuator may be blocked, with some fail-safe valve known per se. Due to the ever present leakage in the safety valve and/or due to internal leakage of the rotary actuator, any torsion moment built up in the adjustable torsion bar will gradually decrease in magnitude as fluid gradually leaks away from the actuator. The additional torsion bar 5 may then provide for sufficient residual stiffness, in particular in the roll direction (around axis R) to allow the vehicle to be driven safely.

Figures 2, 3:
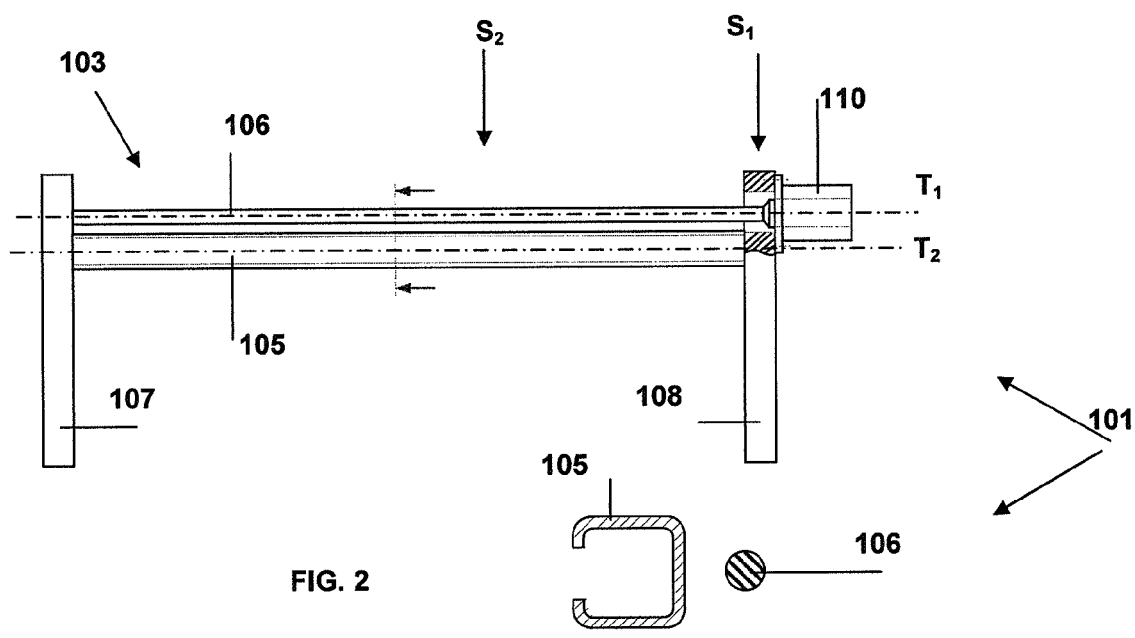
FIG. 2 shows an alternative embodiment of an ARS assembly according to the invention, with the second torsion bar having an open cross section.
FIG. 3 shows the ARS assembly of FIG. 2 in cross section.

FIGS. 2 and 3 show an alternative embodiment of an ARS assembly according to the invention. Parts that are similar to those in FIG. 1 are denoted with similar reference numerals, increased by 100. This alternative embodiment differs from the one shown in FIG. 1, in that the additional torsion bar 105 is construed as a tubular element with an open cross section, in particular a C-shaped cross section, as best seen in FIG. 3.

Thanks to such open cross section, the additional torsion bar 105 will have a relatively low torsion stiffness, but a relatively high bending stiffness. It is noted that the relatively large bending stiffness, at least in a plane extending substantially perpendicular to the torsion axes, may be a similar bending stiffness that is provided in a conventional passive torsion bar assembly. But said additional torsion bar at the same time may have a relatively low torsion stiffness, meaning a torsion stiffness that may be less than 20% of a torsion stiffness of a conventional passive torsion bar assembly which is commonly used in primary vehicle suspensions and/or secondary vehicle suspensions. Consequently, the contribution of this additional torsion bar 105 to the overall torsion stiffness of the ARS assembly 101 will be low, which means that the actuator will only need low additional power to rotate the segments $S_1$, $S_2$, allowing energy consumption to be low. It furthermore allows the ride comfort to be acceptably good while driving over road irregularities. The torsion stiffness of the additional torsion bar 105 may be chosen such, that a residual stiffness to provide adequate roll stability in case the active system is shut down (i.e. in case of failure) is effected.

Figure 4:
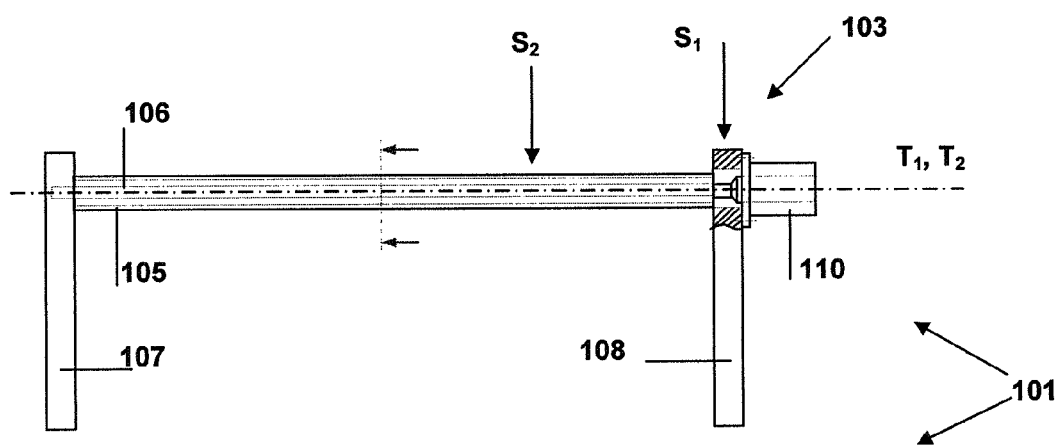
FIG. 4 shows an alternative embodiment of an ARS assembly according to the invention, with the second torsion bar at least partially surrounding the first torsion bar.
Figure 5:
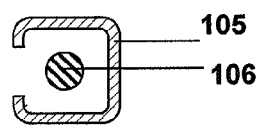
FIG. 5 shows the embodiment of FIG. 4 in cross section.

FIGS. 4 and 5 show a further elaboration of the embodiment of FIGS. 2 and 3. Similar parts have been denoted with similar reference numerals. In this embodiment, the additional torsion bar 105 has an open cross section, similar to the one in FIGS. 2 and 3, and consequently providing the same advantages. The embodiment differs however from the one shown in FIGS. 2 and 3 in that said torsion bar 105 is arranged to surround the centre part 106 of the adjustable torsion bar 103. The resulting assembly 101 is of very compact design. Moreover, as the torsion axes $T_1$, $T_2$ of both bars 103, 105 can substantially coincide, load distribution on the bars 103, 105 and the rotation actuator 110 may be beneficial, i.e. symmetrically distributed, thus not subjected to additional stresses due to the offset between the centre lines of the torsion bars to the torsion rotation axis of the complete assembly.

In all embodiments, the additional torsion bar 5; 105 furthermore provides advantages during normal operation (i.e.

when the hydraulic circuit functioning properly). For one, the additional torsion bar 5; 105 forms a relatively stiff construction together with the arms 7, 8; 107, 108 of the adjustable torsion bar 3; 103 preventing bending in the horizontal plane. The horizontal plane may be defined as the plane extending substantially parallel with respect to the vehicle chassis frame. This relatively stiff construction can withstand external bending loads and minimize deformations in the assembly 1; 101, especially between the centre part 6; 106 and the arms 7,8; 107,108. Consequently, the rotation actuator 10; 110 can be fixated directly to the relevant segment $S_1$, $S_2$, without the need for a bearing or the like provision for absorbing deformations. Accordingly the assembly 1; 101 can be less complex, less costly and more robust.

Figure 7:
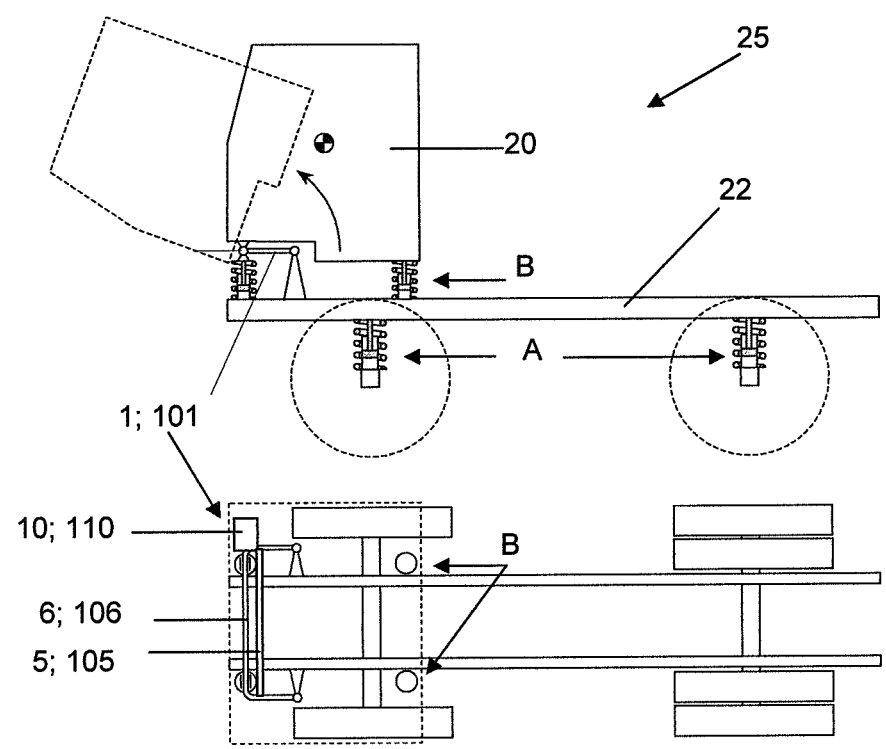
FIG. 7 shows schematically a truck, with an ARS assembly according to the invention applied to the suspension of its cabin.

Also, when the ARS assembly 1; 101 according to the invention is applied in a secondary suspension B for a cabin 20 (as shown in FIG. 7), tilting of said cabin 20 may be facilitated to provide access to components lying underneath the cabin, for instance to provide access to the vehicle engine. Normally it will be done with the motor being shut off, and consequently with the hydraulic circuit being interrupted. The torsion stiffness of the adjustable torsion bar 3; 103 will therefore be close to zero and will provide little stability. Due to space constraints, the means for tilting the cabin 20 usually engage the cabin at one side, i.e. left or right. With the torsion stiffness of the adjustable torsion bar 3; 103 being practically zero, it will be understood that such tilting arrangement will cause the cabin 20 to be lifted at one side only. To prevent this, the segments $S_1$, $S_2$ of the adjustable torsion bar 3; 103 would have to be locked against rotation, with special locking means. Thanks to the additional torsion bar 5; 105 according to the invention, such special locking means may be dispensed with. The additional torsion bar 5, 105 may provide sufficient residual stiffness to allow the cabin 20 to be tilted.

According to another embodiment of the invention, the adjustable torsion bar 3 may be a very stiff bar, which has characteristics resembling that of a shaft. An advantage of such torsion bar is that the needed amount of hydraulic fluid, for instance oil, to feed the hydraulic actuator is relatively small. Since a relatively stiff bar will be minimally subjected to torsion deformations caused by the applied pressure to the actuator, the amount of hydraulic fluid to reach and/or maintain the desired pressure in said actuator will be limited. In other words, when using a stiff torsion bar, the amount of hydraulic fluid to feed the actuator in order to have a desired pressure in said actuator will be less than the amount of hydraulic fluid needed with a less stiff torsion bar to feed the actuator in order to have a desired pressure in said actuator.

Figure 6:
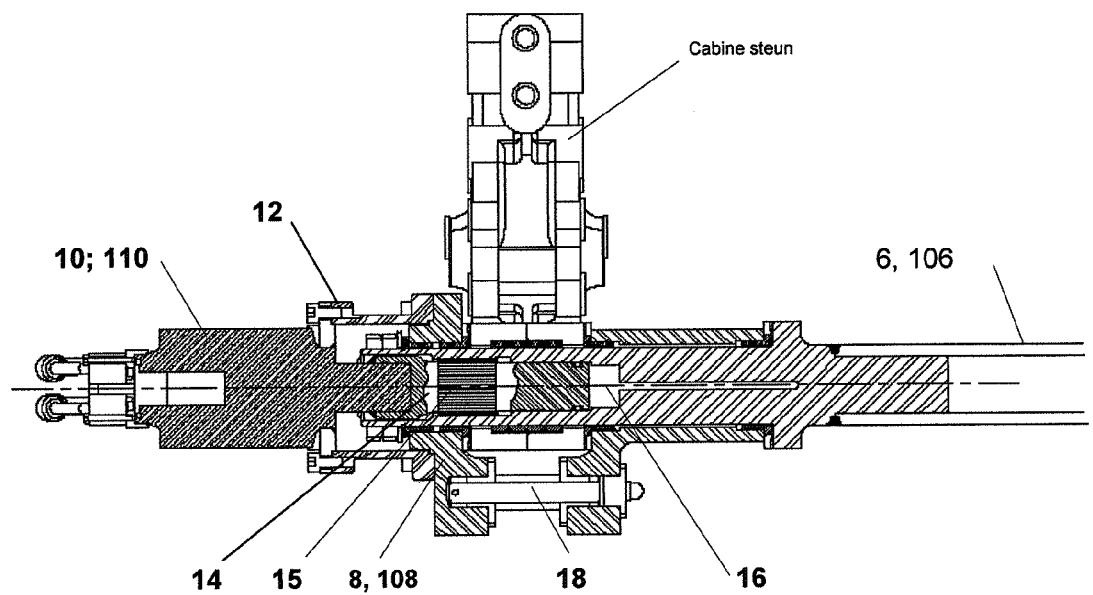
FIG. 6 shows in further detail one possible example of mounting the rotation actuator in the ARS assembly.

FIG. 6 shows in detail an example of a rotation actuator 10; 110 mounted between two segments $S_1$, $S_2$ of an adjustable torsion bar 3; 103 according to the invention, in particular an arm 8; 108 and a centre part 6; 106. The rotation actuator 10; 110 comprises a stationary house 12, that is fixedly connected to the arm 8; 108, for instance by welding or bolting. The actuator 10; 110 furthermore comprises a rotary part 14, that in the present embodiment is connected to the centre part 6; 106 by means of a spline connection 15. Of course, other connections are possible. The spline connection 15 ends in a chamber 16, which can be connected to a pressure source (not shown). By increasing the pressure in the chamber 16 the actuator 10; 110 will be axially displaced, thus allowing the actuator 10; 110 to be disengaged simply from the centre portion 6; 106, for instance for repair, replacement or maintenance.

FIG. 6 furthermore shows how the actuator 10; 110 is mounted to the arm 8; 108 without bearing, as explained above, and how the ARS assembly 1; 101 can be connected to the suspension members of a vehicle suspension via brackets 18 provided on the arms 7, 8; 107,108.

FIG. 7 shows a truck 25, having a cabin 20 which is suspended to the chassis 22 via a secondary suspension B, having four suspension members, two in the front and two at the rear of the cabin 20. An ARS assembly 1; 101 according to the invention is provided between the front suspension members. With the adjustable torsion bar 3; 103, roll motions of the cabin 20 can be adequately suppressed. Additionally, the ARS assembly 1; 101 allows easy tilting of the cabin 20, as explained above. The assembly 1; 101 furthermore guides vertical movements of the cabin and supports the cabin in the horizontal plane with respect to the vehicle chassis frame. The latter function can mainly be performed by the additional torsion bar 5; 105, which can be designed to have adequate bending stiffness in said horizontal and vertical direction without substantially increasing the overall torsion stiffness of the assembly. Consequently, the torsion bar 3; 103, in particular its centre part 6; 106, can be redesigned so as to be less torsionally stiff. This will be beneficial for the high frequent ride comfort of the cabin 20, which is predominantly determined by said torsion stiffness of the adjustable torsion bar 3; 103. The low frequent ride comfort can be actively controlled with the hydraulic actuator.

Also, thanks to the additional torsion bar 5; 105 and its residual stiffness the spring members may be levelled with a relative simple, conventional levelling system, instead of a more complex provision, wherein each member requires its own levelling system.

The invention is not in any way limited to the exemplary embodiments presented in the description and drawing. All combinations (of parts) of the embodiments shown and described are explicitly understood to be incorporated within this description and are explicitly understood to fall within the scope of the invention. Moreover, many variations are possible within the scope of the invention, as outlined by the claims.

The invention claimed is:

1. A suspension system for a vehicle comprising a primary suspension assembly for suspending the vehicle wheels to a chassis of the vehicle and a secondary suspension assembly for suspending a vehicle cabin to the chassis, the secondary suspension assembly comprising an ARS (active roll stabilization) assembly that includes a first adjustable torsion bar and a rotation actuator for adjusting a torsion angle of said torsion bar, and further comprising an additional torsion bar having a torsion axis extending substantially parallel to a torsion axis of the first adjustable torsion bar, wherein the adjustable torsion bar comprises a centre part and two arms each extending substantially transverse to the centre part, said two arms being configured for connection of said centre part between two sides of the suspension, wherein the additional torsion bar extends between said arms, said rotation actuator comprising a stationary house fixed directly to one of the arms and a rotary part fixed to said centre part, said rotation actuator being arranged for rotatably interconnecting said centre part and said one of the arms.

2. The suspension system according to claim 1, wherein the additional torsion bar increases a bending stiffness of the ARS assembly without substantially increasing a torsion stiffness of the ARS assembly, at least in a plane extending substantially perpendicular to the torsion axes.

3. The suspension system according to claim 1, wherein the additional torsion bar has a fixed torsion stiffness.

4. The suspension system according to claim 1, wherein the additional torsion bar has a torsion stiffness that is less than 20% of a torsion stiffness of a passive torsion bar assembly used in primary vehicle suspensions or secondary vehicle suspensions.

5. The suspension system according to claim 1, wherein the additional torsion bar is of tubular shape.

6. The suspension system according to claim 1, wherein the additional torsion bar has an open cross section.

7. The suspension system according to claim 1, wherein the torsion axes of the first adjustable torsion bar and the additional torsion bar substantially coincide.

8. The suspension system according to claim 1, wherein the additional torsion bar at least partially surrounds the adjustable torsion bar.

9. The suspension system according to claim 1, wherein a stationary part of the rotation actuator is directly fixated to one of the segments of the adjustable torsion bar, that is without intermediate bearing.

10. The suspension system according to claim 1, wherein a rotary part of the rotation actuator is fixated to one of the segments of the adjustable torsion bar via a spline-connection, wherein the spline connection ends in a chamber which can be connected to an external pressure source, enabling the rotary part of the rotation actuator to be disengaged from said segment by pressure.

11. The suspension system according to claim 1, wherein the ARS assembly comprises measurement means for measuring lateral motions of the vehicle mass and control logic for controlling the rotation actuator on the basis of such measurements and a control strategy.

12. The suspension system according to claim 6, wherein the open cross section of the additional torsion bar is a C-shape.

* * * * *